(12) United States Patent
López Fernández et al.

(10) Patent No.: US 10,919,611 B2
(45) Date of Patent: Feb. 16, 2021

(54) OPENING AND SECURE-CLOSING SYSTEM

(71) Applicant: AIRBUS OPERATIONS S.L., Madrid (ES)

(72) Inventors: David López Fernández, Madrid (ES); Maria Aránzazu García Patino, Madrid (ES); Sergio Gil GonzáLez, Madrid (ES)

(73) Assignee: Airbus Operations S.L., Madrid (ES)

( * ) Notice: Subject to any disclaimer, the term of this patent is extended or adjusted under 35 U.S.C. 154(b) by 469 days.

(21) Appl. No.: 15/890,690

(22) Filed: Feb. 7, 2018

(65) Prior Publication Data
US 2018/0222567 A1    Aug. 9, 2018

(30) Foreign Application Priority Data
Feb. 8, 2017  (EP) ..................... 17382056

(51) Int. Cl.
*B64C 1/14* (2006.01)
*E06B 5/12* (2006.01)
*B64D 41/00* (2006.01)

(52) U.S. Cl.
CPC .......... *B64C 1/1407* (2013.01); *B64C 1/1446* (2013.01); *E06B 5/12* (2013.01); *B64D 2041/002* (2013.01)

(58) Field of Classification Search
CPC ... B64C 1/1407; B64C 1/1446; B64C 1/1461; E06B 5/12; B64D 2041/002
USPC ...................................... 244/129.5
See application file for complete search history.

(56) References Cited

U.S. PATENT DOCUMENTS

| | | | |
|---|---|---|---|
| 5,125,695 A | 6/1992 | Hartwell | |
| 6,745,982 B2 * | 6/2004 | Lehmann | B64C 1/1469 244/118.5 |
| 6,830,217 B2 * | 12/2004 | Movsesian | B64C 1/1469 244/118.5 |
| 7,665,694 B2 * | 2/2010 | Hein | B64D 41/00 244/129.5 |
| 7,938,366 B2 | 5/2011 | Martinez Rueda et al. | |
| 8,096,498 B2 * | 1/2012 | Francisco | F02C 7/042 244/53 B |

(Continued)

FOREIGN PATENT DOCUMENTS

| | | | | |
|---|---|---|---|---|
| CA | 2555444 A1 * | 4/2007 | ........... | B64C 1/1407 |
| DE | 40 20 842 | 1/1992 | | |

(Continued)

OTHER PUBLICATIONS

Proposed Equivalent Safety Finding on CS 25.783: "Fuselage Doors"—Applicable to Airbus A350-941, 2007, three pages.

(Continued)

*Primary Examiner* — Christopher P Ellis
(74) *Attorney, Agent, or Firm* — Nixon & Vanderhye P.C.

(57) ABSTRACT

A safety open and closing system for an overpressure door on fuselage of an aircraft. Wherein the safety opening and closing system allows safe access through the overpressure door to the compartment. The safety open and closing system including an assembly of a hollow beam, a blocking bar in the hollow beam, a spring biasing the blocking bar with respect to the hollow beam and a lever at the end of the blocking beam which pivots between a position A that allows closure of the overpressure door and a position B preventing closure of the door.

18 Claims, 9 Drawing Sheets

(56) References Cited

U.S. PATENT DOCUMENTS

| | | | |
|---|---|---|---|
| 8,740,147 B2* | 6/2014 | Defrance | E05C 19/02 244/129.4 |
| 2006/0266887 A1* | 11/2006 | Holder | G05D 7/014 244/129.5 |
| 2007/0045472 A1* | 3/2007 | Erben | B64C 1/1415 244/129.5 |
| 2008/0149772 A1 | 6/2008 | Sandiford et al. | |
| 2009/0118876 A1* | 5/2009 | Yadollahi | E05B 51/023 701/14 |
| 2015/0375866 A1* | 12/2015 | Salgues | B64C 1/1423 244/129.5 |
| 2016/0229513 A1* | 8/2016 | Scheel | B64D 29/08 |
| 2017/0341729 A1* | 11/2017 | Arevalo Rodr Guez | B64C 7/00 |
| 2018/0156334 A1* | 6/2018 | Takeuchi | B64D 45/00 |

FOREIGN PATENT DOCUMENTS

| | | | |
|---|---|---|---|
| EP | 0133082 B1 * | 3/1987 | ........... B64C 1/1407 |
| EP | 1 780 119 | 5/2007 | |
| EP | 2 886 453 | 6/2015 | |
| ES | 2 301 304 | 6/2008 | |
| WO | 2006122755 | 11/2006 | |

OTHER PUBLICATIONS

European Search Report cited in 17382056.4 dated Jul. 28, 2017, seven pages.

\* cited by examiner

OPENING AND SECURE-CLOSING SYSTEM

CROSS RELATED APPLICATION

This application claims priority to United Kingdom patent application EP 17382056.4 filed 8 Feb. 2017, the entirety of which is incorporated by reference.

TECHNICAL FIELD OF THE INVENTION

The present invention belongs to the field of safety open and closing system for doors, more particularly, to the field of safety open and closing system for overpressure doors which give access to chambers of an aircraft.

BACKGROUND OF THE INVENTION

In the field of aeronautics, the auxiliary power unit (APU) is typically housed in a chamber of an aircraft fuselage, such as in the tail cone. The chamber comprises maintenance doors which should meet the following main requirements:

(i) the doors should open automatically if an overpressure is provided in the chamber during flight of the aircraft, and (ii) there should be safe operation in the opening and/or closing of the doors when maintenance is carried out on the chamber and on the APU.

To meet above requirements and in view of the possibility of a system failure event, an overpressure door is provided for a compartment containing an APU. The overpressure door is installed in a door, such as a maintenance door, to the chamber. The overpressure door opens to release excess pressure from the APU compartment. The pressure may be released into the tail cone or outside the aircraft. The pressure is released to avoid undesirable loads on the structures within the compartment and on the compartment itself. Also, opening the overpressure door during maintenance avoids a reduced pressure in the chamber causing suction that holds closed a maintenance door.

In case that an operator accidentally closes the overpressure door whilst maintenance APU doors are open, it is known to provide a safety device to prevent closing of the maintenance door. Spanish patent application ES2301304 A1 (also shown in U.S. Pat. No. 7,938,366) shows a safety device installed in an overpressure door on the maintenance door.

SUMMARY OF THE INVENTION

The maintenance tasks related to opening an overpressure door may include checking the oil level of the APU without opening the maintenance door. Thus, it is needed to provide an improvement of the safety device which, advantageously, is a simpler and lighter mechanism, and to provide a safety device simpler to use and more secure.

An opening and secure-closing system for doors has been invented and is disclosed herein for a chamber of an aircraft.

In a first embodiment, the invention provides an opening and secure-closing system for doors arranged in a chamber of an aircraft, wherein the opening and secure-closing system comprising:

an overpressure door configured to be located in the chamber and being adapted for opening towards the outside of the chamber, at least one rotatory fitting configured to be joined to a first frame structure of the chamber and to the overpressure door, such at least one rotatory fitting being adapted for pivoting around a first hinge axis of the overpressure door, and a safety device comprising, a fixing element configured to be joined to the first frame structure of the chamber, a beam joined to the fixing element by a first end of the beam, the beam being a hollow beam provided in a direction axis X-X' which is perpendicular to the first hinge axis, a blocking bar arranged within the beam, the blocking bar being configured to move internally along the beam, a lever element hingedly connected to the blocking bar and comprising two main extreme positions A and B, the lever element (9) being configured to be pulled, moving away from the first frame structure in a direction parallel to the direction axis X-X' at the same time that the blocking bar is also pulled in the same way as the lever element, to turn around the beam at the same time that the blocking bar is also configured to turn inside the beam in such a way that the lever element moves between both positions A and B, and to contact with the at least one rotatory fitting being the lever element provided in the position B, and a spring located around the blocking bar and within the beam, wherein the blocking bar of the safety device is configured to traverses a first passage hole of the first frame structure of the chamber, the pulling movement of the lever element allows to move away from the first frame structure in such a way that the spring is compressed by the actuation of the blocking bar along the beam allowing the lever element stars turning around the beam, and when the lever element is in position B, in contact with the rotatory fitting (2), the overpressure door is prevented from closing.

The phrase "safety device" is used herein to refer to a light-weight safety device. The fact that the safety device is implies that it is a simpler mechanism comprising less numbers of elements, but it fulfills the technical requirements related to the securing system.

In a particular embodiment, the overpressure door of the system is adapted for opening towards the outside of the chamber in the flight direction of the aircraft.

The safety device is an improve device which, advantageously, facilitates the maintenance door sequence avoiding damages in maintenance operators in case of overpressure occurs into the chamber of the aircraft. Additionally, the device blocks the maintenance door of the chamber in closed position and blocks the overpressure door in open position.

Furthermore, the present safety device provides a device which is reliable because the mechanism provided by the present device is robust. That is because the blocking elements (elements which helps blocking the overpressure door and also the maintenance door), are small, so the risk of deformation of such blocking elements of the present device is reduced.

The safety device, advantageously, provides pressure release from the chamber outwards the aircraft in order to avoid undesirable loads on the aircraft structure. Additionally, such device avoids maintenance door suction whenever the overpressure door is open.

The phrase "hingedly connected" refers to a mechanical joint or a connection between two solid components. This connection allows both elements to move because such elements converge, for example, on the same axis (direction axis X-X'). The hingedly connection also allows the movement of both elements at the same time.

Furthermore, the present safety device, advantageously, provides a simpler blocking drive movement since an operator only have to make a pulling movement and a turning movement of the lever element.

In a particular embodiment, the position A of the lever element is provided when the lever element is arranged in a horizontal position parallel to the first hinge axis, and also when the lever element does not contact with any element. In another particular embodiment, the position B of the lever element is provided when the lever element is arranged in contact with the rotatory fitting.

The fact that the lever element contact with the rotatory fitting, advantageously, prevents the overpressure door will be closed allowing the opening of the maintenance doors of the chamber for maintenance operations. Additionally, when the overpressure door is open the block is more secure and reliable than the solutions of the prior art because, advantageously, the lever element blocks contacting directly with a rotatory fitting of the overpressure door. Such lever element contacts directly with the elements in charge of allowing the opening/closing of the overpressure door, and not with other secondary elements. Thus, the risks of blocking fail are reduced.

In a more particular embodiment the position A is substantially 180 degrees opposite to the position B of the lever element.

In a particular embodiment, the lever element comprises a hole through which, advantageously, an operator can easily hold the lever element to start pulling and turning such lever element.

In a particular embodiment, the opening and secure-closing system comprises two rotatory fittings configured to be joined to a first frame structure of the chamber, and also to the overpressure door. In a more particular embodiment, the safety device is arranged between both rotatory fittings.

In a particular embodiment the beam comprises a first retention means and a second retention means which are extent longitudinally from such beam, the retention means being configured to maintain the lever element fixed on the positions A or B. In a more particular embodiment, the protrusion are both arranged in such a way that maintains the lever element fixed in a horizontal manner on the positions A or B.

Advantageously, the fact that the the retention means maintain the lever element fixed in the position A allows an operator to access the lever element in a simple way through the overpressure door. Also, when the lever element is provided in the position A, the lever element is arranged without any other elements hindering the operation in its movement for reaching the lever element into the chamber.

Furthermore, the fact that the retention means maintain the lever element fixed in the position B in contact with the rotary fitting, advantageously, allows the lever element does not miss the contact with the rotatory fitting and avoids the closure of the overpressure door.

In a particular embodiment, the spring is configured to be compressed when the lever element is pulled until is released from the first retention means of the beam, allowing the lever element to turn around the retention means of the beam from the position A to the position B of such lever element or vice versa.

The spring allows the pulling movement of the lever element until the lever element can start rotate around the beam.

In a particular embodiment, when the lever element is provided in the position A, the spring is provided in a natural state, without suffering elongation or compression. In a more particular embodiment, when the lever element passes from the position A to the position B, the spring is compressed during the pulled and turned movement of such lever element. Additionally, in a particular embodiment, when the lever element achieved the position B, the spring returns to its natural state. In still another particular embodiment, when the lever element achieved the position B is substantially elongated without reaching the natural state as in the position A.

In a particular embodiment, the blocking bar comprises a first projection around the blocking bar, the first projection being in contact with the beam and also being in contact with the spring, in such a way that the first projection is configured to force the spring during the pulling movement of the lever element.

Advantageously, the first projection helps in the compression and elongation of the spring when the blocking bar is moved along the beam due to the action of the lever element. Additionally, the first projection avoids the elongation of the spring until an operator releases the lever element.

In a particular embodiment, the blocking bar further comprises a second projection which extends longitudinally from a second end of the blocking bar, the second projection being joined to the lever element.

In a more particular embodiment, the second protrusion is configured to turn at the same time that the lever element turns around the beam.

Advantageously, the second projection of the blocking bar provides a simple and direct hingedly connection between the lever element and the blocking bar. Thus, when the lever element is pulled and/or turned the blocking bar is also pulled and/or turned respectively at the same time thanks to the hingedly connection.

In another particular embodiment, the system further comprises a first door and a second door adapted for accessing the interior of the chamber; for opening towards the outside of the chamber, the first door and second door being hinged around a second hinge axis and a third hinge axis respectively; and for housing the overpressure door in at least one of the doors. In a more particular embodiment, the first and second doors are maintenance doors for the operators accessing the interior of the chamber and performing maintenance operations.

In a particular embodiment, the system further comprising securing means configured to ensure the closure of the first door and second door, the securing means being located in a fixed structure within the chamber.

In a more particular embodiment, the securing means are configured to house a first end of the blocking bar when the lever element is provided in the position A.

Advantageously, the securing means ensure the closure of such doors when the overpressure door is closed, and when the lever element is provided in the position A. Thus, until the lever element is pulled to position A, the first end of the blocking bar is housed in the securing means ensuring the closure of the first and second doors.

Once the lever element starts to be pulled to the position A the blocking bar is moved away from the securing means at the same time, in such a way that the first end of the blocking bar is released from the securing means. Thus, when the blocking bar is released from the securing means, the first and second door are allowed for being open.

In a particular embodiment, the system further comprises driving means for the opening/closing operation arranged inside of the chamber, such driving means for the opening/closing operation are means of controlled and sequential opening/closing operation of the first door and second door, and they are configured to be manually actuated from outside the chamber through the overpressure door, when the overpressure door is open.

In a more particular embodiment, the overpressure door comprises at least one latch faced outside the chamber, such at least one latch being configured to be manual reached from outside the chamber for the opening operation of the overpressure door.

In a second inventive aspect, the invention provides an aircraft comprising a chamber with an opening and secure-closing system according to the first inventive aspect.

In a particular embodiment, the chamber is located on the tail cone of an aircraft. In a more particular embodiment, the chamber is a compartment which contains an auxiliary power unit.

All the features described in this specification (including the claims, description and drawings) and/or all the steps of the described method can be combined in any combination, with the exception of combinations of such mutually exclusive features and/or steps.

DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE INVENTION

Figure 1:
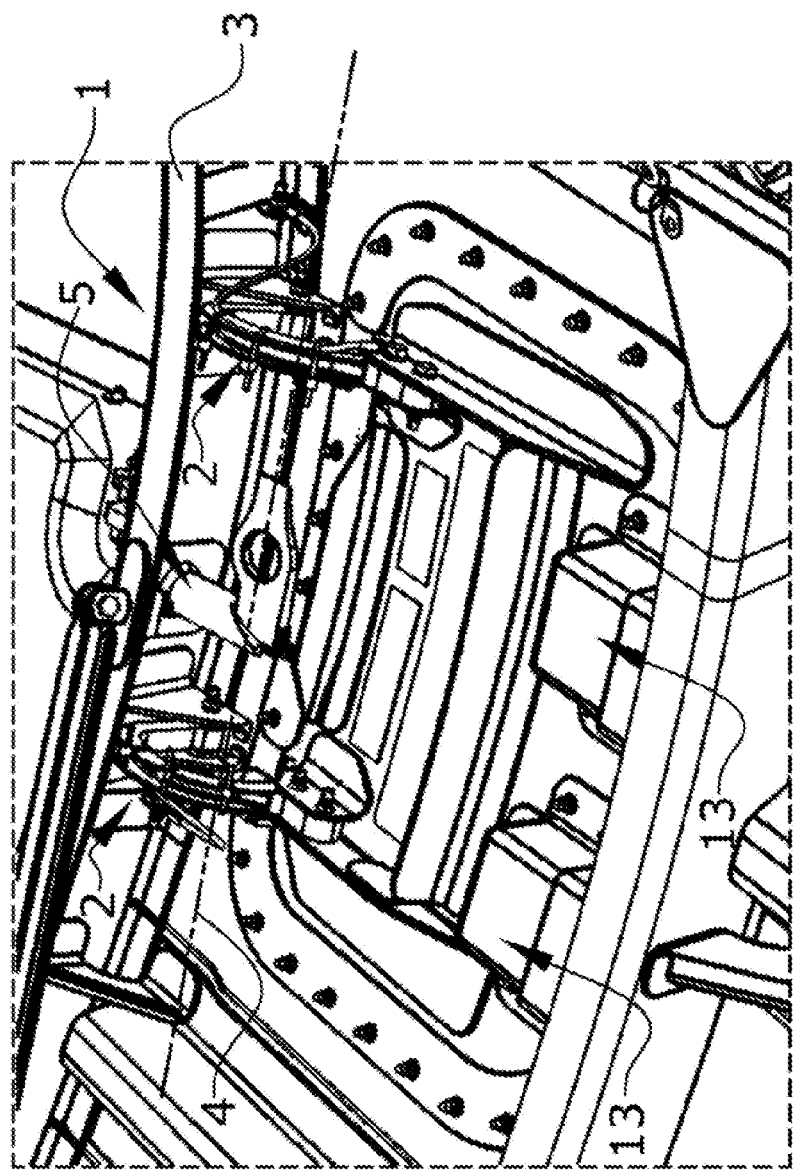
FIG. 1 shows an overpressure door and a system according to an embodiment of the present invention.
Figure 9:
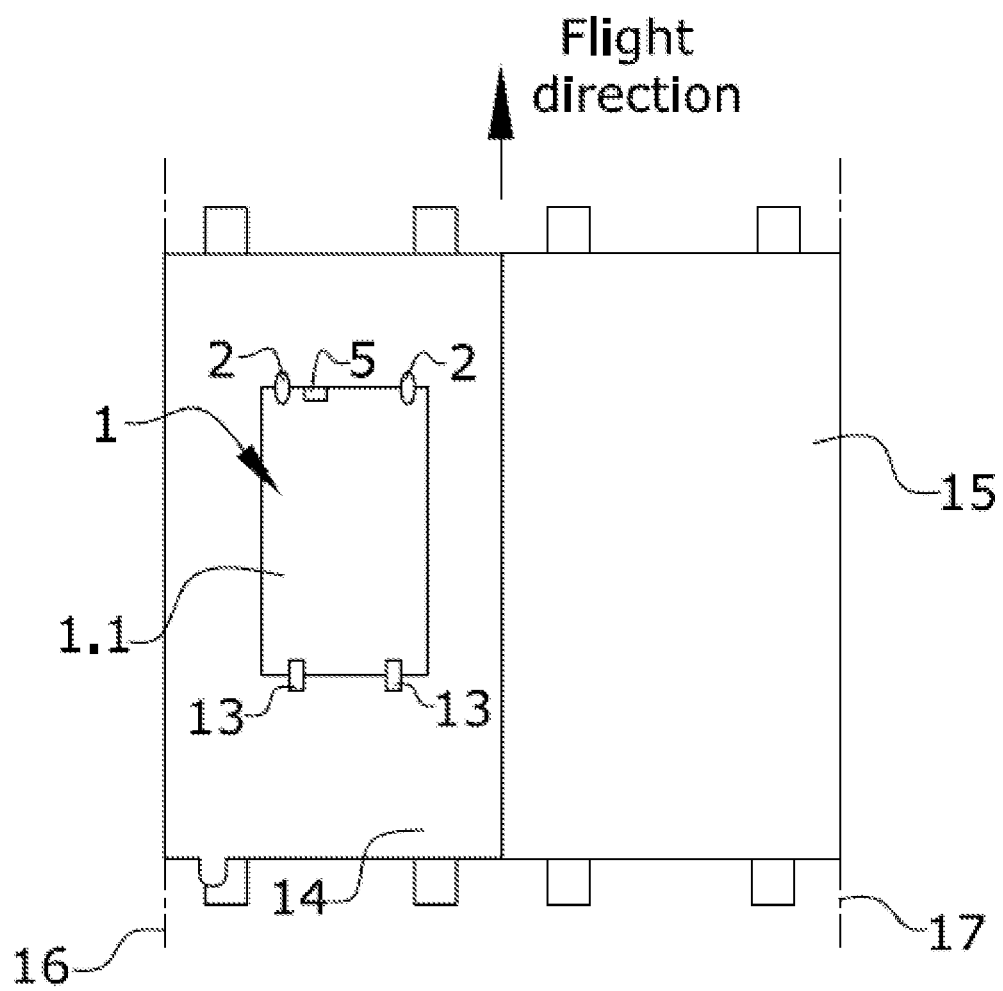
FIG. 9 is an upper schematic view of two maintenance doors according to a particular embodiment of the present invention.
Figure 10:
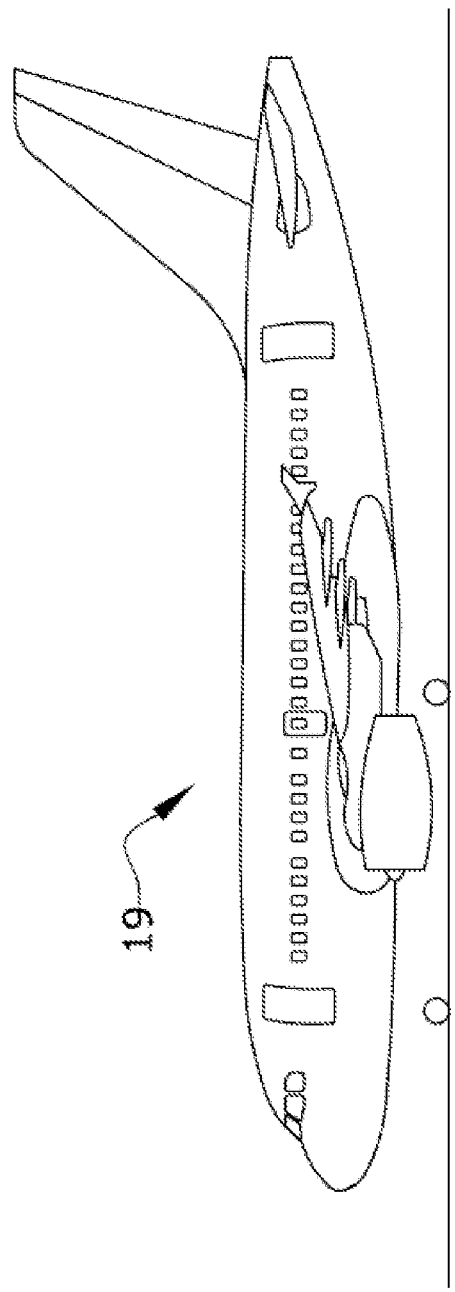
FIG. 10 shows an aircraft according to the present invention.

FIG. 1 shows an opening and secure-closing system for doors (14, 15 shown in FIG. 9) arranged in a chamber (18 shown in FIG. 9.) of an aircraft (19 shown in FIG. 10). The opening and secure-closing system comprises an overpressure door (1) arranged in a chamber (18) of an aircraft (19). Such chamber (18) comprises a first frame structure (3) and two rotatory fittings (2) joined to the first frame structure (3) and to the overpressure door (1). The overpressure door (1) comprises a first hing axis (4) on which such rotatory fittings (2) hinge around when the overpressure door (1) is opened towards the outside of the chamber (18), or when the overpressure door (1) is closed towards the inside of the chamber (18) (shown in FIG. 6).

Furthermore, the system comprises a safety device (5) joined to the first frame structure (3) of the chamber (18) and located between two rotatory fittings (2). The safety device (5) prevents the overpressure door (1) from closing while a lever element (9) is in a position B, as shown in FIGS. 8A and 8B. The safety device (5) including an assembly of a hollow beam (7), a blocking bar (8) in the hollow beam, a spring (10) biasing the blocking bar with respect to the hollow beam, and a lever element (9) at the end of the blocking beam which pivots between a position A (FIGS. 7A and 7B) that allows closure of the overpressure door and a position B (FIGS. 8A and 8B) preventing closure of the door. The lever element (9) prevents closure of the door by preventing pivoting of the rotatory fittings (2) that form a hinge between the door (1) and the fuselage.

The overpressure door (1) comprises two latches (13) which are manually reached from outside the chamber (18) for the opening operation of the overpressure door (1). FIG. 1 shows structures inside the chamber (18) including a view of the back of the latches (13). The latches face outward of the chamber and fuselage and are accessible from outside the chamber (18).

Figure 2:
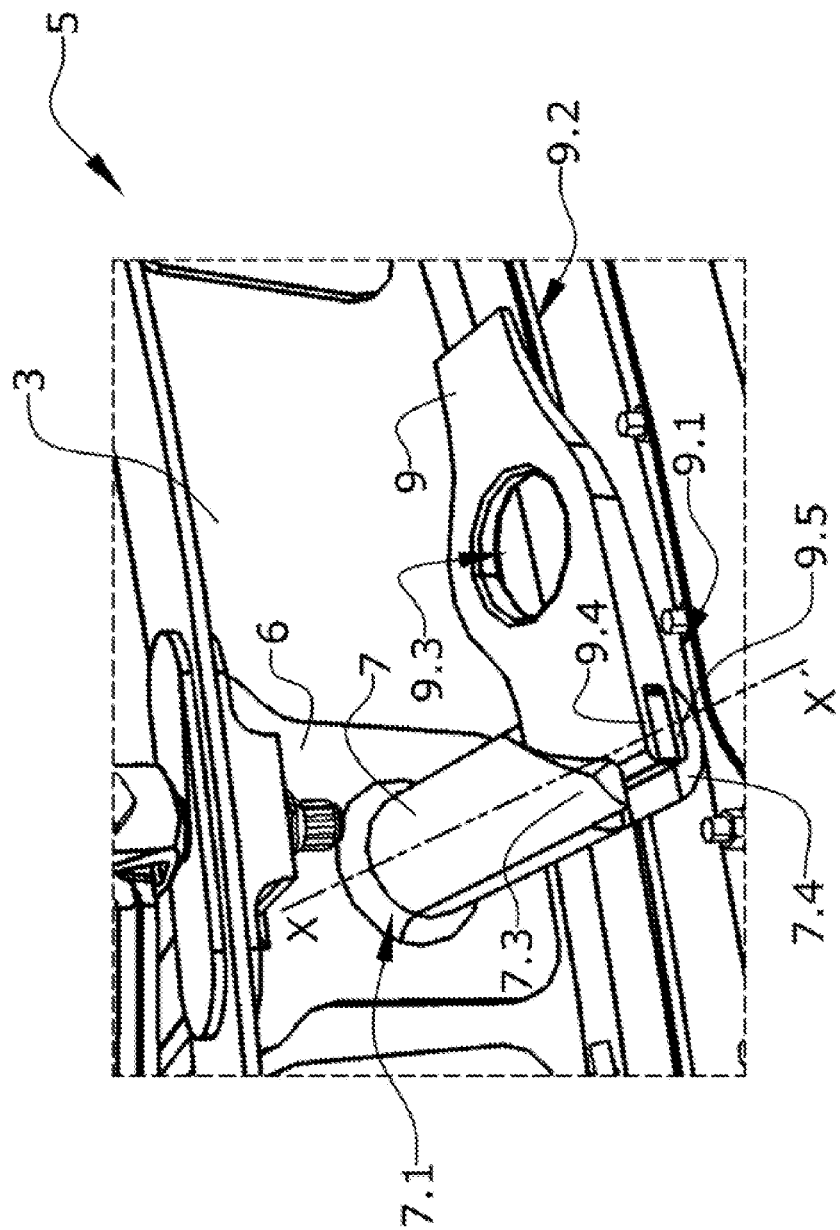
FIG. 2 is a perspective view of the safety device according to an embodiment of the present invention.
Figure 3:
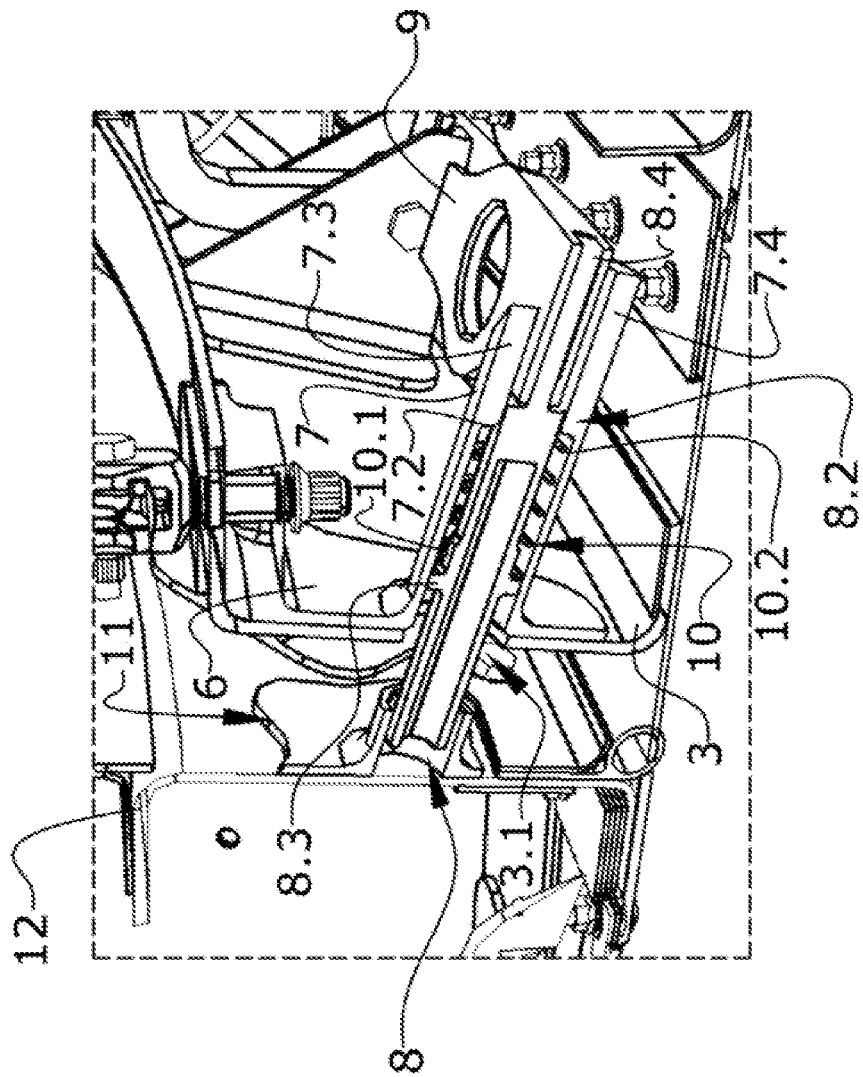
FIG. 3 is a perspective cross sectional view of the safety device according to an embodiment of the present invention.

FIGS. 2 and 3 shows a safety device (5) which comprises a fixing element (6) joined to the first frame structure (3), a beam (7) joined to the fixing element (6) by its first end (7.1) and arranged in contact with a lever element (9) which is hingedly connected to a blocking bar (8) located within the beam (7). The beam (7) is a hollow beam provided in a direction axis X-X' which is perpendicular to the first hinge axis (4). Such beam (7) comprises retention means (7.3, 7.4) which extend longitudinally at an end of the beam (7) opposite to the first end (7.1).

The lever element (9) of the safety device (5) is arranged in a horizontal position A which comprises a direction parallel to the direction axis X-X'. Thanks to the retention means (7.3, 7.4) the lever element (9) is fixed in the position A (FIGS. 7A and 7B, and in FIGS. 2 and 3), and can also be fixed in a position B (FIGS. 8A and 8b). The lever element (9) is arranged in the position B when the lever element (9) is in contact with the rotatory fitting (2). Additionally, the lever element (9) comprises a hole (9.3) through which an operator can easily hold the lever element (9).

The lever element (9) comprises a first end (9.1) and a second end (9.2) being opposite between them in a direction parallel to the first hinge axis (4). The lever element (9) is joined by its first end (9.1) to a second projection (8.4) of a blocking bar (8) (shown on FIG. 3), being the second end (9.2) of the lever element (9) a free end. The joint between the first end (9.1) of the lever element (9) and the second projection (8.4) allows such lever element (9) and the blocking bar (8) to move at the same time.

The lever element (9) comprises two projections (9.4, 9.5) which extent longitudinally from the lever element (9) in its first ends (9.1), in such a way that the second projection (8.4) of the blocking bar (8) is located and joined between the two projections (9.4, 9.5) of the lever element (9). Thus, the second projection (8.4) of the blocking bar (8) is housed between the two projections (9.4, 9.5).

Additionally, the lever element (9) decreases its thickness from its first end (9.1) to the second end (9.2).

FIG. 3 shows a safety device (5) with a blocking bar (8) located within the beam (7) and going through a first passage hole (3.1) of the first frame structure (3) of the chamber (18). The safety device (5) also comprises a spring (10) located around the blocking bar (8) and within the beam (7).

The blocking bar (8) comprises a first projection (8.3) in contact with the interior of the beam (7) and also in contact with one of the end of the spring (10). In this particular example, the spring (10) comprises a first end (10.1) and a second end (10.2) in such a way that the first end (10.1) is closer to the first passage hole (3.1) of the first frame structure (3) than the second end (10.2) which is opposite to the first end (10.1) in the direction axis X-X'. Thus, the first projection (8.3) of the blocking bar (8) is in contact with the first end (10.1) of the spring (10). In a particular embodiment, the first projection (8.3) is a circumferential projection arranged around the blocking bar (8).

When the lever element (9) is pulled, moving away from the first frame structure (3) in a direction parallel to the direction axis X-X', the blocking bar (8) is also pulled in the same way as the lever element (9) at the same time, in such a way that the spring is compressed by the actuation of the blocking bar (8) along the beam (7). The compress movement of the spring is performed because the first projection (8.3) of the blocking bar (8) pushes the spring away from the first passage hole (3.1) of the first frame structure (3).

The retention means (7.3, 7.4) of the beam (7) comprises a thickness greater than the thickness of the beam (7), is such a way that a thick jump (7.2) is configured to stop the spring (10) in its second end (10.2). Thus the first projection (8.3) of the blocking bar (8) and the thick jump (7.2) of the beam (7) provide the compress movement of the spring (10).

The second projection (8.4) of the blocking bar (8) is a projection extending longitudinally from the second end (8.2) of the blocking bar (8). In this particular example, part of the projection (8.4) joined to the lever element (9) stand out from the retention means (7.3, 7.4) of the beam (7) in a cantilever.

FIG. 3 shows a particular example wherein the system comprises securing means (11) located in a fixed structure (12) of the chamber (18). The blocking bar (8) comprises a first end (8.1) which is housed in the securing means (11) when the lever element is in its position A, as is shown in FIG. 7B. The first end (8.1) is pulled out of the securing means when the lever element is in position B, as is shown in FIG. 8B.

Figure 4:
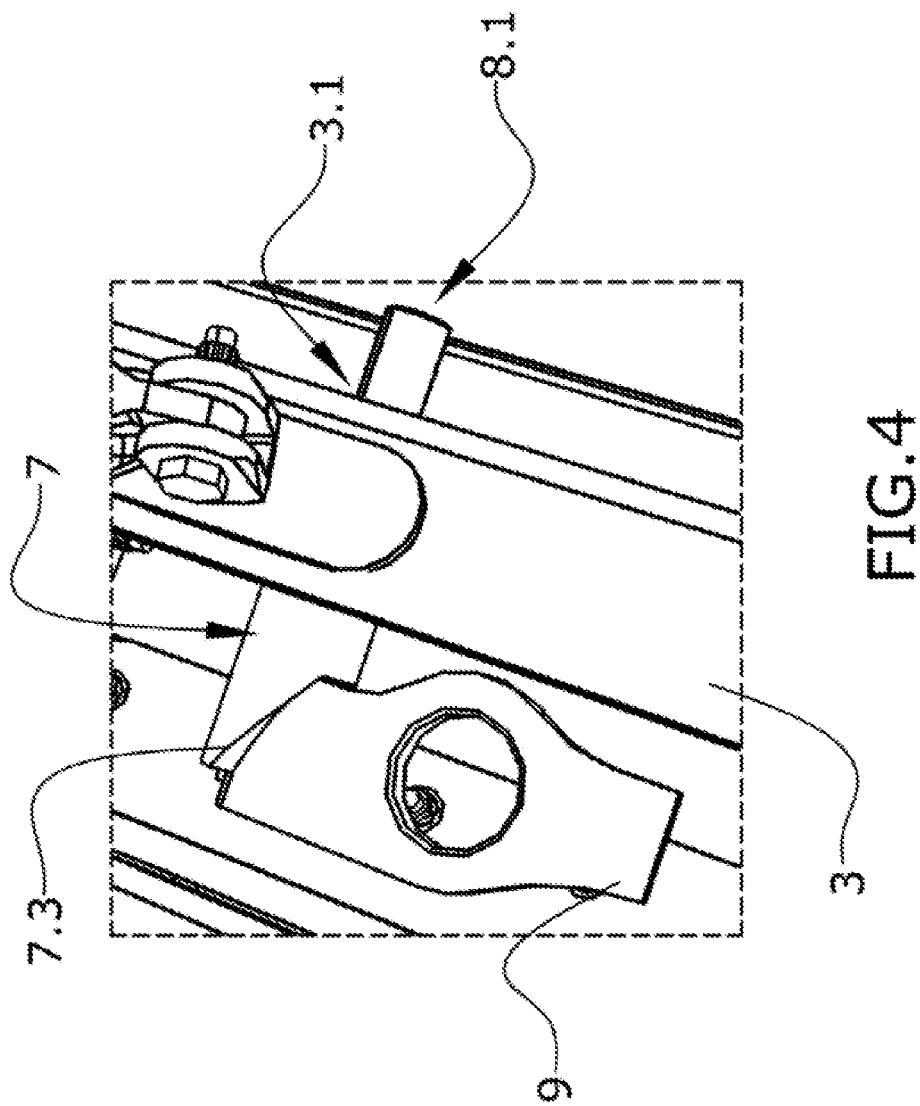
FIG. 4 is a detailed perspective view of the safety device according to an embodiment of the present invention.

FIG. 4 shows the safety device (5) with a lever element (9) arranged in its position A, and a blocking bar (8) going through the first passage hole (3.1) of the first frame structure (3) in such a way that the first end (8.1) of the blocking bar (8) is arranged in cantilever.

Figure 5:
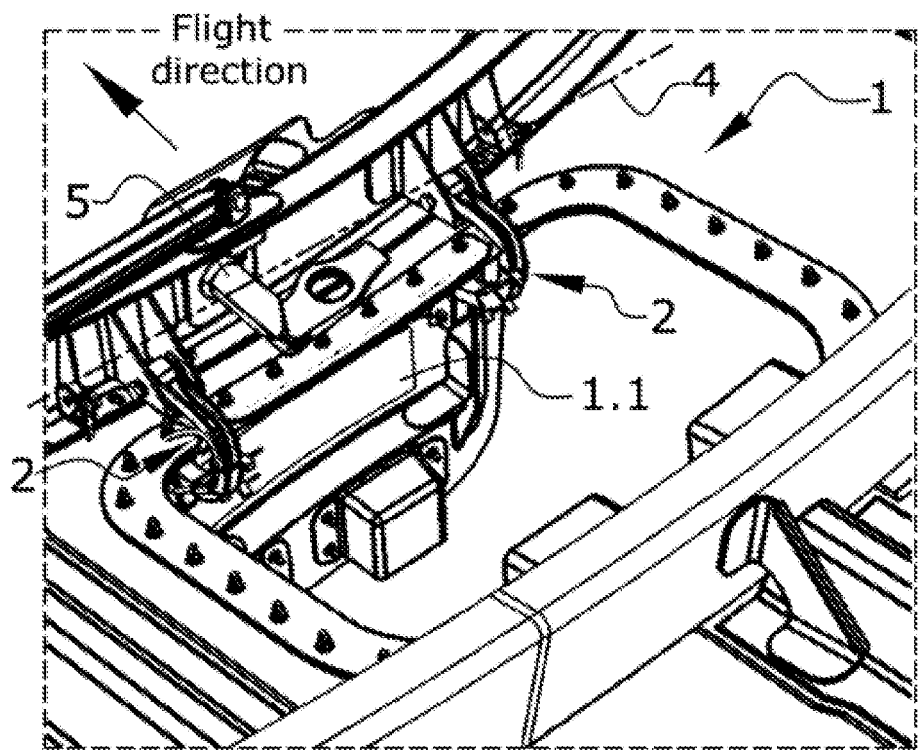
FIG. 5 is a perspective view of an overpressure door according to an embodiment of the present invention.

FIG. 5 shows an overpressure door (1) partially open due to the pivoting movement of the rotatory fittings (2) around the first hinge axis (4). As it can be observed in this figure, the overpressure door (1) is open in the flight direction of the aircraft (19). The overpressure door (1) comprises a first side (1.1) faced to the inside of the chamber (18) when the overpressure door (1) is closed, and a second side (1.2) faced outside the chamber when the overpressure door (1) is open or closed.

Figure 6:
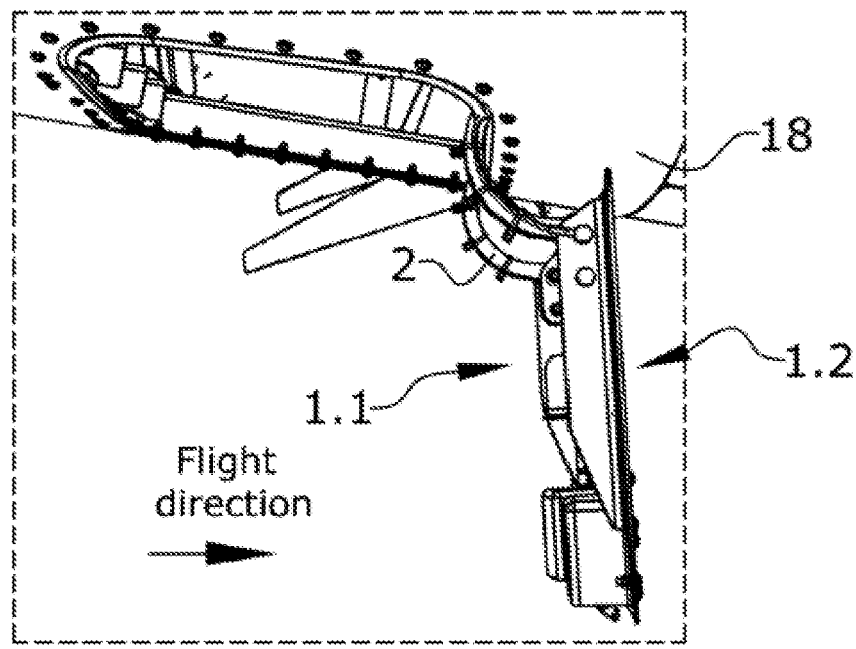
FIG. 6 is a lateral view of an overpressure door according to an embodiment of the present invention.

FIG. 6 shows a lateral view of the overpressure door (1) open towards the outside of the chamber (18), in such a way that the first side (1.1) of such overpressure door (1) is faced to the flight direction of the aircraft (19).

Figure 7A:
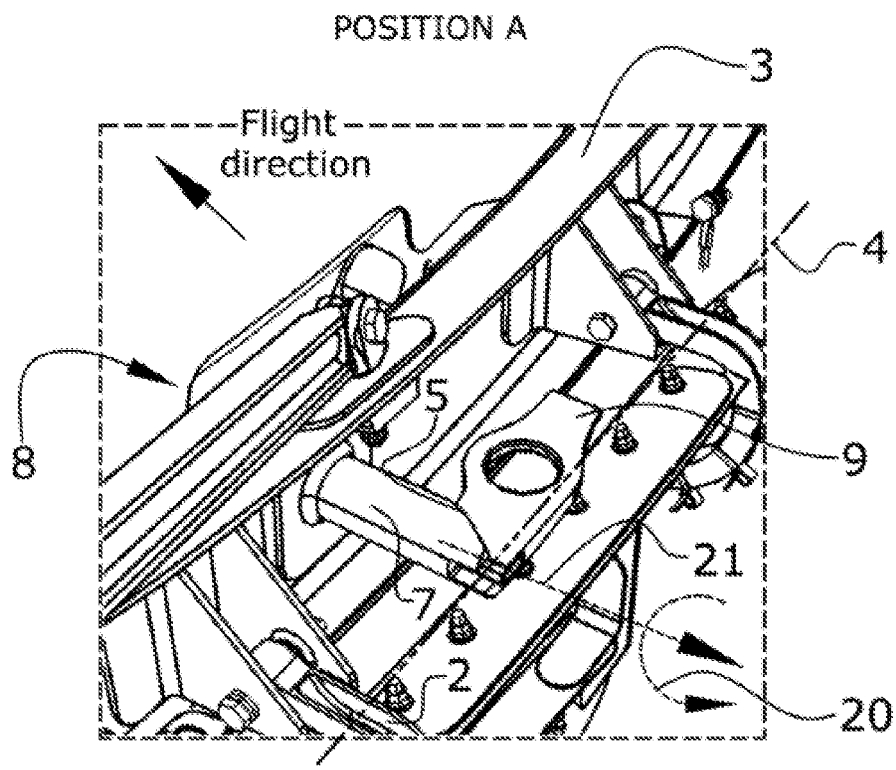
FIGS. 7A and 7B show the safety device in a particular position according to an embodiment of the present invention.
Figure 7B:
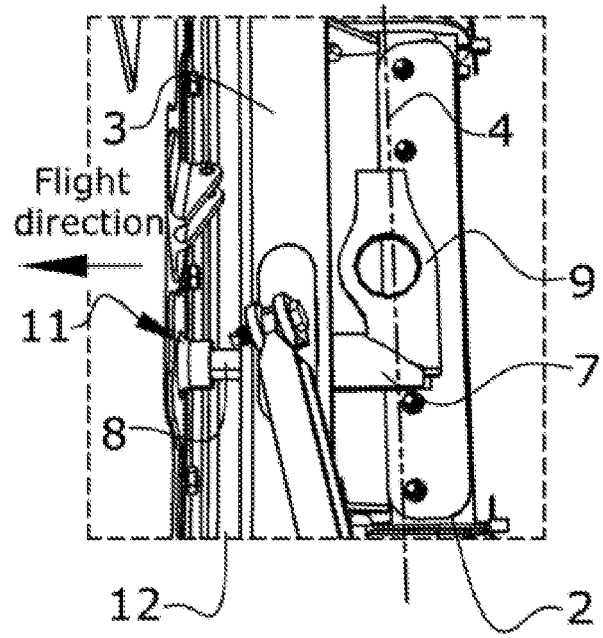
Figure 8A:
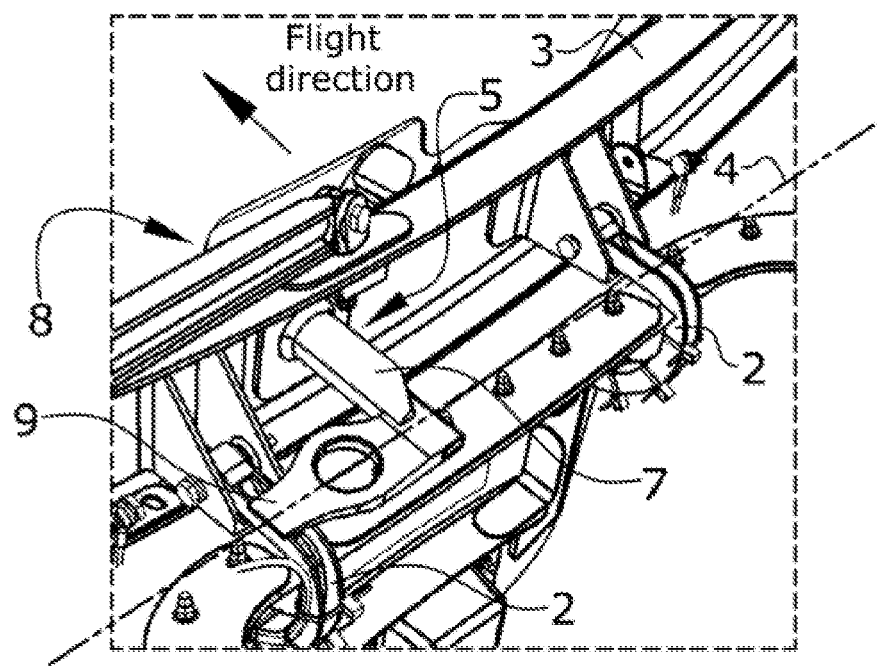
FIGS. 8A and 8B show the safety device in a particular position according to an embodiment of the present invention.
Figure 8B:
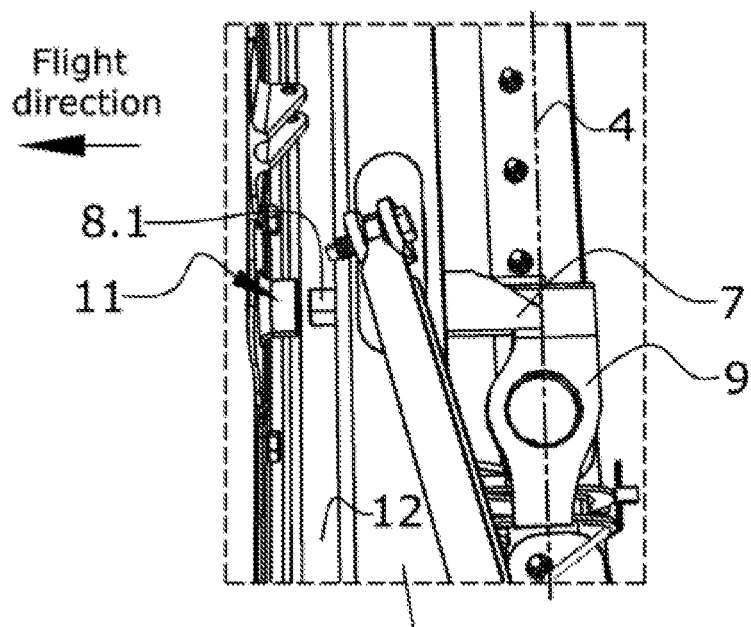

FIGS. 7A and 7B show different views of the lever element (9) of the safety device (5) in the position A when the lever element (9) is free of contact at its second end (9.2). In position A, the lever element (9) is arranged in a horizontal position parallel to the first hinge axis (4).

FIG. 7A shows a perspective view of the safety device (5) with a lever element (9) arranged in its position A, and an overpressure door (1) open (not shown). The lever element (9) being arranged perpendicular to the flight direction of the aircraft (19). Additionally, in this figure it is shown a first arrow (20) which represents the direction of the turning movement of the lever element (9) when the lever element (9) is moved from the position A to the position B. Also, in this figure it is shown a second arrow (21) which represents the direction of the pulling movement of the lever element (9) when such lever element (9) is pulled in a direction contrary to the flight direction.

Furthermore, in this particular example the first end (8.1) of the blocking bar (8) is in cantilever after the blocking bar (8), in such a way that such blocking bar (8) goes through the first frame structure (3) (not shown in FIG. 7A).

FIG. 7B shows an upper view of the safety device (5) with a lever element (9) arranged in its position A. Additionally, in the figure it is shown securing means (11), located in a fixed structure (12), wherein the blocking bar (8) is housed by its first end (8.1). Thus, the securing means ensure the closure of the maintenance doors (14, 15) of the chamber (18) of the aircraft (19).

While the overpressure door (1) is closed, the lever element (9) of the safety device (5) is provided in the position A, and the blocking bar (8) is in cantilever (not shown in FIG. 7A), or the blocking bar (8) is housed in the securing means (11) (shown in FIG. 7B). Also, while the overpressure door (1) is already open, but the safety device (5) has not yet been activated, the lever element (9) is provided in the position A, and the blocking bar (8) is in cantilever (not shown in FIG. 7A), or the blocking bar (8) is housed in the securing means (11) (shown in FIG. 7B).

FIGS. 8A and 8B show different views of the lever element (9) of the safety device (5) in the position B when the lever element (9) is in contact with the rotatory fitting (2).

FIG. 8A shows a perspective view of the safety device (5) with a lever element (9) arranged in its position B, and an overpressure door (1) open (not shown).

In this particular example the first end (8.1) of the blocking bar (8) is also in cantilever, but the first end (8.1) is now closer to the first frame structure (3) (not shown in FIG. 8A) than in the particular example of FIG. 7A. This is because in FIG. 8A the lever element (9) is already pulled and turned until it contacts with the rotatory fitting (2).

FIG. 8B shows an upper view of the safety device (5) with a lever element (9) arranged in its position B. Additionally, in the figure it is shown securing means (11), located in a fixed structure (12), and how the first end (8.1) of the blocking bar (8) is in cantilever between the securing means (11) and the first frame structure (3). In this particular example, as it can be observed, the blocking bar (8) is not housed in securing means because the lever element (9) is already pulled and turned until it contacts with the rotatory fitting (2). Thus, the securing means (11) now allows the opening/closing operation of the maintenance doors (14, 15) of the chamber (18) of an aircraft (19).

FIGS. 7A and 8A show the movement operation of the lever element (9) of the safety device (5) for preventing the closure of the overpressure door (1) by the actuation of an operator. Also, the blocking elements provided by the present safety device (5) are shown, such blocking elements being the lever element (9) and the securing means (11).

FIGS. 7B and 8B show the movement operation of the lever element (9) of a safety device (5) for preventing the closure of the overpressure door (1) by the actuation of an operator, and also for allowing the opening/closing operation of the maintenance doors (14, 15) by the actuation of driving means by an operator.

FIG. 9 shows an upper schematic view inside the chamber (18) of a first maintenance door (14) and a second maintenance door (15) parallel between them and the flight direction of the aircraft (19). These doors (14, 15) comprise two hinge axes (16, 17) respectively over which the doors (14, 15) hinge around in its opening/closing operation. In this particular example, the hinge axes (16, 17) are parallel to the flight direction of the aircraft (19).

Furthermore, in this FIG. 9 it is shown an overpressure door (1) arranged in the first maintenance door (14) and including a light safety device (5) located between two rotatory fittings (2). Additionally, the overpressure door (1) comprises two latches (13) located in an end of the overpressure door (1) being opposite to the rotatory fittings (2) in the flight direction of the aircraft (19).

FIG. 10 shows a lateral view of an aircraft (19) including a light safety device (5) (not shown) according to the present invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. An opening and secure-closing system for a door in a chamber of an aircraft, the opening and secure-closing system comprising:
   an overpressure door for the chamber and adapted to open towards an outside of the chamber;
   at least one rotatory fitting configured to be joined to a first frame structure of the chamber and to the overpressure door, wherein the at least one rotatory fitting is adapted to move along a path as the at least one rotary fitting pivots about a first hinge axis of the overpressure door, and
   a safety device comprising,
   a fixing element configured to be joined to the first frame structure of the chamber,
   a beam joined to the fixing element by a first end of the beam, the beam being a hollow beam extending along a direction axis X-X' perpendicular to the first hinge axis,
   a blocking bar arranged within the beam, wherein the blocking bar is configured to move internally within the beam,
   a lever element hinged to a first end of the blocking bar and configured to pivot about the blocking bar between a position A and a position B, wherein, as the lever element moves from position A to position B moves, a second end of the blocking bar moves along the direction axis X-X', and wherein while the lever arm is at position B, the lever arm is in the path and blocks movement of the at least one rotatory fitting and while the lever arm is at position A, the lever arm is out of the path, and
   a spring arranged around the blocking bar and within the beam,
   wherein as the lever element moves from position A to position B, the blocking bar of the safety device is configured to traverse a first passage hole of the first frame structure of the chamber, and
   when the lever element is in position B and blocking the movement the at least one rotatory, the overpressure door is prevented from closing.

2. The opening and secure-closing system according to claim 1, wherein the position A is 180 degrees opposite to position B of the lever element.

3. The opening and secure-closing system according to claim 1, wherein the beam comprises a first retention element and a second retention element which extents longitudinally from the beam, the retention element being configured to maintain the lever element fixed at positions A or B.

4. The opening and secure-closing system according to claim 3, wherein the spring is configured to be compressed when the lever element is pulled until is released from the first retention means of the beam, allowing the lever element to turn around the retention means of the beam from the position A to the position B of such lever element.

5. The opening and secure-closing system according to claim 1, wherein the blocking bar comprises a first projection around the blocking bar, the first projection is in contact with the beam and in contact with the spring.

6. The opening and secure-closing system according to claim 1, wherein the blocking bar further comprises a second projection extending longitudinally from a second end of the blocking bar, and the second projection is joined to the lever element.

7. The opening and secure-closing system according to claim 6, wherein the second protrusion is configured to turn with the lever element.

8. The opening and secure-closing system according to claim 1, wherein the system further comprises a first door and a second door adapted for:
   accessing the interior of the chamber,
   opening towards the outside of the chamber,
   the first door is configured to pivot about a second hinge axis and the second door is configured to pivot about a third hinge axis, and
   the overpressure door is incorporated into at least one of the first and second doors.

9. The opening and secure-closing system according to claim 8, further comprising securing means configured to ensure the closure of the first door and second door, the securing means located in a fixed structure within the chamber.

10. The opening and secure-closing system according to claim 9, wherein the securing means are configured to house a first end of the blocking bar when the lever element is in position A.

11. The opening and secure-closing system according to claim 8, wherein the system further comprises a driving element configured to open or close at least one of the first and second doors.

12. The opening and secure-closing system according to claim 1, wherein the overpressure door comprises at least one latch facing outside of the chamber.

13. An aircraft comprising a chamber with the opening and secure-closing system according to claim 1.

14. An opening and secure-closing system including:
an overpressure door for a chamber within a fuselage of an aircraft, wherein the overpressure door is at an outer surface of the fuselage;
a first frame structure of the chamber and extending longitudinally in a direction parallel to a hinge axis;
a rotatory fitting joined to the first frame structure in the chamber and to the overpressure door, wherein the rotatory fitting moves along a path to pivot the overpressure door about the hinge axis, and
a safety device including:
   a fixing element attached to the first frame structure;
   a hollow beam having a first end attached to the fixing element and a second end region opposite to the first end, wherein the beam extends into the chamber from the first frame structure along a longitudinal axis perpendicular to the hinge axis;
   a blocking bar within and coaxial to the hollow beam, wherein the blocking bar moves along the longitudinal axis with respects to the hollow beam;
   a lever element having a hinge pivotably connected to the second end region of the hollow beam and a projection abutting the second end region of the hollow beam, wherein the lever element pivots between positions A and B, and
   a spring coaxial with and in the hollow beam and biasing the blocking bar along the longitudinal direction,
   wherein, as the lever element pivots from position A to position B, the projection of the lever element moves along the second end of the hollow beam, pulls the blocking bar out of a securing element fixed to a second frame element and compresses the spring; and
   wherein while in position B, the lever element is in the path of the rotatory fitting and prevents closure of the overpressure door.

15. The opening and secure-closing system of claim 14 wherein the chamber is in a tail cone of a fuselage of the aircraft and is configured to house an auxiliary power unit.

16. The opening and secure-closing system of claim 14 wherein the second end region of the hollow beam includes surfaces slanted with respect to the longitudinal axis and the slanted surfaces engage the projection of the lever element.

17. The opening and secure closing system of claim 14, wherein the fixing element includes a plate attached to the first frame structure and the first end of the hollow beam is attached to the plate.

18. The opening and secure closing system of claim 17, wherein the plate is perpendicular to the hollow beam.

* * * * *